United States Patent

Tracy et al.

[11] Patent Number: 6,139,325
[45] Date of Patent: Oct. 31, 2000

[54] DEVICE FOR DETERMINING COLOR COMBINATIONS

[76] Inventors: Gloria Tracy, 95 N. Ashwood St., #611, Ventura, Calif. 93003; Susan Levin, 114 W. Bowling Green, Port Hueneme, Calif. 93041

[21] Appl. No.: 09/342,552

[22] Filed: Jun. 29, 1999

[51] Int. Cl.⁷ .................................................. G09B 19/00
[52] U.S. Cl. ........................ 434/104; 356/423; 434/101; 434/81
[58] Field of Search ................. 434/81, 84, 98, 434/104, 101; 356/423

[56] References Cited

U.S. PATENT DOCUMENTS

| | | | |
|---|---|---|---|
| 1,483,529 | 2/1924 | Tanner | 434/104 |
| 2,196,397 | 4/1940 | McDonald | 434/104 |
| 2,237,165 | 4/1941 | Scheuer | 434/104 |
| 2,858,624 | 11/1958 | Bowman | 434/98 |
| 2,866,277 | 12/1958 | Wise | 434/98 |
| 2,938,281 | 5/1960 | Miller | 434/98 |
| 4,112,594 | 9/1978 | Impatasto | 434/104 |
| 4,400,161 | 8/1983 | Gerit | 434/104 |
| 4,594,070 | 6/1986 | Stoddard | 434/104 |
| 4,761,137 | 8/1988 | Taylor | 434/99 |
| 4,973,253 | 11/1990 | Shook | 434/104 |

*Primary Examiner*—Jacob K. Ackun
*Assistant Examiner*—K. Fernstrom
*Attorney, Agent, or Firm*—Kelly Bauersfeld Lowry & Kelley, LLP

[57] ABSTRACT

A device for determining aesthetically harmonious color combinations includes a color selector wheel rotatably attached to a base having a plurality of distinct color selection groups disposed beyond and surrounding the periphery of the color selection wheel. Each color group section forms a window through which samples can be viewed. The color selector wheel has color selection indicia in the form of at least one symmetrical geometric symbol centered on the face of the color selector wheel. The indicia each have a primary vertex and a plurality of secondary vertices disposed adjacent to the periphery of the color selector wheel such that alignment of the primary vertex with a selected color selection group automatically aligns the secondary vertices with harmonious color combination selection groups and allows the user to develop progressive color coordinating combinations.

5 Claims, 1 Drawing Sheet

DEVICE FOR DETERMINING COLOR COMBINATIONS

BACKGROUND OF THE INVENTION

The present invention relates to color wheels and, more particularly, to a device which aids in the identification of progressive color combinations which are aesthetically pleasing.

The three primary colors are red, yellow and blue. The colors are called primary because they cannot be mixed from other colors. When formed into a circle and each of the three primary colors is mixed with its adjacent color, secondary colors are created. For example, combining red and yellow results in orange, yellow and blue results in green, and blue and red results in violet. A third tier of colors is created by mixing one primary with its adjacent secondary color resulting in yellow/green, blue/violet, red/violet, red/orange and yellow/orange. Subsequent tiers of colors can be created by continuing to mix adjacent colors.

The sequence of colors on a color wheel isn't happenstance. It is based on the order in which color appears in the spectrum of light from the shortest wavelength to the longest. Red, orange, yellow, green, blue and violet is the sequence seen in a rainbow. When these colors are arranged into a circle, a color wheel is formed. Intermediary colors are created by combining adjacent colors as described above. Various color values (the lightness or darkness of the color) are created by adding varying amounts of white (creating a tint of the color) or black (creating a shade of the color). Fashionable colors, colors which are in vogue at a given time, are created by adding gray to the color or hue.

Among others, color wheels are often used by artists, decorators, florists, cake decorators, painters and people involved in crafts such as quilting, needlework, beading and scrap-booking. Painters typically mix various pigments of paint and either add white, gray or black to create a needed color. Non-painters do not have the luxury of mixing colors to obtain new colors and must use color wheels to find aesthetically pleasing color combinations. For example, an interior decorator may want to find multiple color combinations in decorating the flooring, drapery, walls, furniture and accessories of a room.

Pleasing color combinations have been found to lie with colors which are on opposing edges of the color wheel (complementary), colors which are equidistant from one another (triad colors) and those that lie on either side of either the color (blended colors) or those that lie on either side of the complementary color (split-complementary). Other variations of pleasing combinations are possible as well by combining the colors found at the corners of symmetrical geometric shapes placed within the color wheel.

Many color wheels or selectors have been developed, but all suffer limitations. A painter's color wheel provides guidelines for how much color to add to another color to create a desired color. The color wheel typically comprises two rotatable dials, an outer dial sectioned into colors, and a smaller dial overlying the larger dial and having sections marked with primary colors and white and black. Windows are selectively placed in the smaller dial sections. As the smaller dial is rotated over the larger dial, the windows reveal the color resulting from adding the primary color, black or white to the color indicated on the larger dial. The color wheel may also include grey scales and limited color combinations. This particular color wheel is designed for the painter who mixes pigments to arrive at a desired color, and is excessively complicated for the non-painter or average consumer. Additionally, the color wheel does not have apertures under which a sample may be placed for matching colors. Furthermore, different color values are not available for easy matching.

Another known color selector comprises a transparent sheet having a form of a color wheel printed on the sheet. The sample is placed under the clear sheet and a matching color, or its approximate color, is found. Lines are provided to find complementary colors. However, multiple color combinations are difficult or even impossible to identify using this device.

A third known type of color wheel utilizes a large opaque backing plate or sheet having a single aperture therethrough, a color dial overlying and connected to the backing plate, and a rotatable disc centered on and attached to the color dial. The color dial includes several color sections which surround the periphery of the rotatable disc. Each color section contains six sub-sections which are formed in a ring around an aperture. The disc has a section indicating alignment with the color section selected and five outer portions identified as blending color combinations, triad color combinations, and contrast color combinations. In use, a sample is placed under the aperture and the dial having the color sections is rotated until a matching color is found. The alignment indicator of the disc is positioned towards the color segment, and the blending, triad and contrast colors are indicated. However, there is no provision for comparing more than one sample at a time as there is only one aperture through the back dial. Furthermore, the number of color combinations which are possible are limited as there is no provision for combining more than one set of three individual colors. Therefore, a user wanting to find a color combination for the decoration of the interior of a room is limited to three colors indicated on the color wheel for the numerous pieces and furnishings of the room.

Therefore, what is needed is a color wheel which allows the user to compare more than one color sample at any given time. What is further needed is a color wheel which allows the user to create a number of color combinations based on predetermined colors and which also aids the user in creating progressive combinations of coordinating colors. Additionally, what is needed is a color wheel which accomplishes the above while being simple to operate. The present invention fulfills these needs and provides other related advantages.

SUMMARY OF THE INVENTION

The present invention relates to a color selector device designed to match colors in an aesthetically harmonious manner. The color selector device comprises, generally, a color selector wheel rotatably attached to a base having a plurality of distinct color selection groups disposed beyond and surrounding the periphery of the color selection wheel. Each color group section forms a window through which samples can be viewed. The color selector wheel has color selection indicia in the form of at least one geometric symbol centered on the face of the color selector wheel. The indicia each have a primary vertex and a plurality of secondary vertices disposed adjacent to the periphery of the color selector wheel.

The geometric symbols are symmetrical and include at least one triangle and/or at least one quadrilateral. The color selection indicia also includes a pair of arrows disposed on opposite edges of the color selector wheel. The at least one triangle typically includes an equilateral triangle and an isosceles triangle disposed on the face of the color selector wheel such that the triangles overlap one another. The primary vertices may be opposite to one another 180° about the periphery of the wheel. The at least one quadrilateral includes a square and a non-equilateral rectangle disposed on the face of the color selector wheel such that the square and non-equilateral rectangle overlap one another. The vertices of the square and nonequilateral rectangle may or may not overlap one another depending on the embodiment used.

Each of the plurality of distinct color section groups on the base contain multiple sub-sections having individual predetermined color values. A given value sub-section correlates with another value sub-section of each color selector group.

After selecting a color to be matched, the primary vertex of the selected geometric symbol indicia is aligned with the color selection group having that color. Automatically, the secondary vertices of the geometric symbol indicia align with harmonious color combination selection groups.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
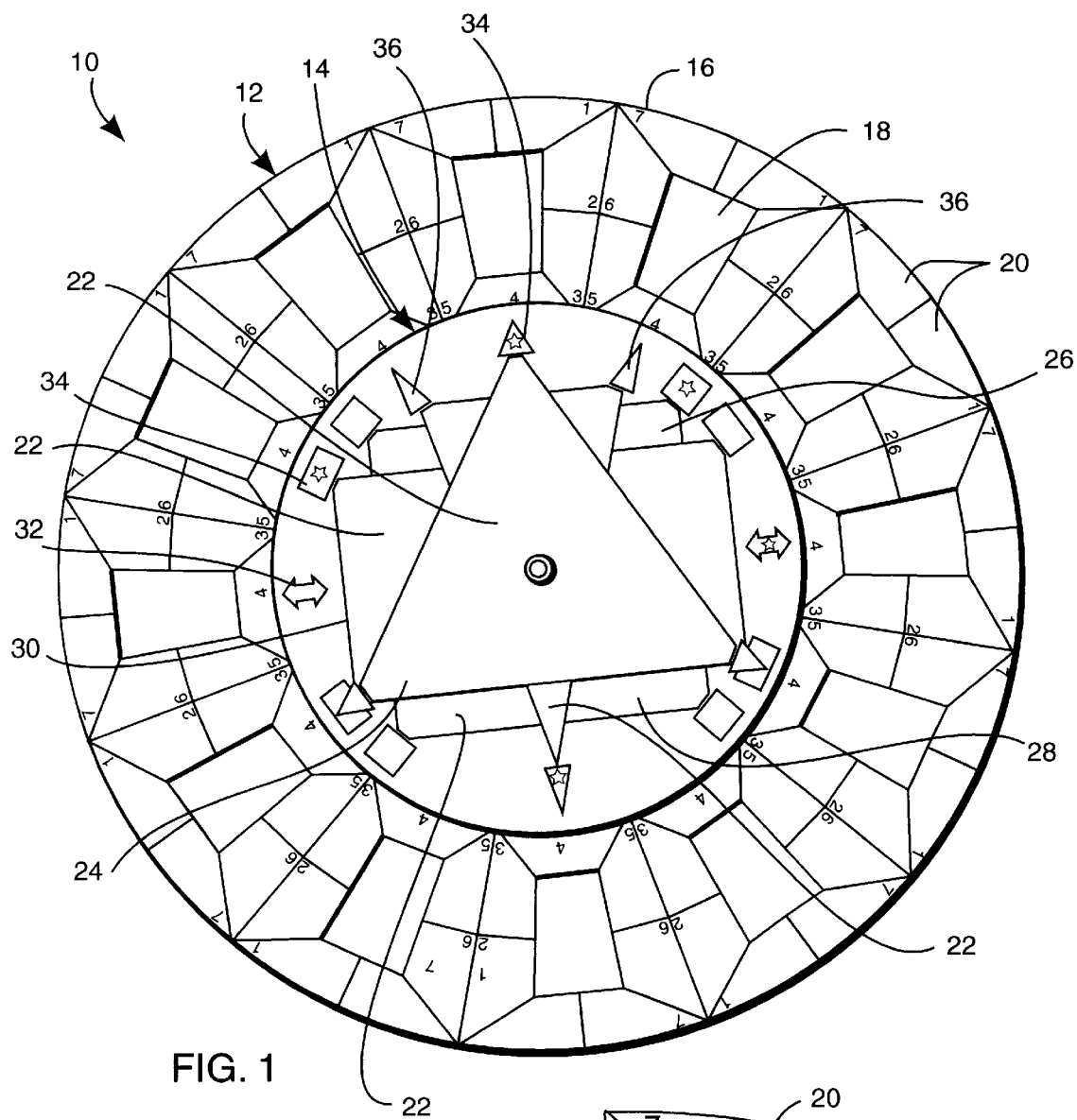
FIG. 1 is a top plan view of a color selector device embodying the present invention.

As shown in the drawings for purposes of illustration, the present invention is concerned with a color wheel selector device for determining pleasing color combinations, referred to generally by the reference number 10. The device 10 is generally comprised of a base 12 and a color selector wheel 14 rotatably attached to the base 12. The base 12 and selector wheel 14 are typically comprised of a cardboard or plastic material, but can be comprised of any other suitable material. Although an exemplary circular base 12 and selector wheel 14 are illustrated, the base 12 and selector wheel 14 can be of varying shapes so long as the device 10 functions as intended.

The base 12 includes a plurality of distinct color selection groups 16 disposed beyond and surrounding the peripheral edges of the color selection wheel 14. Typically, the twelve colors or hues of the third tier of color are used. Therefore, the configuration of the colors starting at blue and traveling clockwise are: blue/green, green, green/yellow, yellow, yellow/orange, orange, red/orange, red, red/violet, violet, blue violet, and then back to blue. The number of color selection groups 16 can be reduced or increased as needed. Due to the science of color theory, the number of sections preferably represent the tiers of color; namely, three, six, twelve, twenty-four, etc. Cutout windows 18 are formed in each color selection group 16 to facilitate the comparison and matching of samples to the color and value in the selection group 16.

Figure 2:
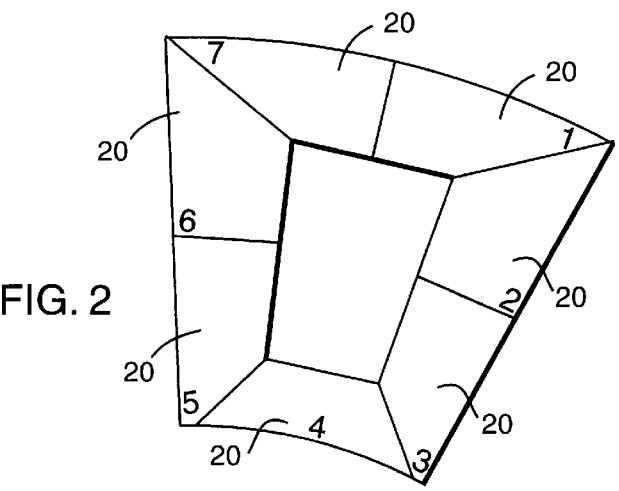
FIG. 2 is an enlarged view of one selection group located at the periphery of the color selector device of FIG. 1.

As is more easily seen in FIG. 2, the selection groups 16 are each divided into smaller subsections 20. Each of the subsections has a predetermined color value. One of the values will represent the hue or true color. The remaining values are the lightness or darkness of the hue as measured against a gray scale that runs from white to black. Adding white to the color creates a tint of that color. For example, pink is a tint of red. Adding black to a color creates a shade of that color. For example, navy is a shade of blue. Addition of gray of the same value as the color creates tones. Tones are usually temporarily fashionable, and tints and shades of a particular color are generally considered to be timeless.

Seven subsections are illustrated in FIG. 2, with the hue typically in the "4" position and three tints of increasing lightness on one side of the window 18 and three shades of increasing darkness along the other. The seven color values of one color selection group 16 correspond with like numbered color value subsections of the remaining color selection groups 16. For example, if the "7" subsection had the lightest tint of red, the "7" subsection would also have the lightest blue, yellow, green and so forth. If 10% white were added to create the lightest tint of red, 10% white would preferably be used for the remaining colors as well. The number of subsections used is random and can be modified to suit the consumer's need. Also, the amount of white or black used to create the tints and shades can be modified. Although not to be limited in form, using hues, tints and shades is preferable over tones as the color selector device 10 can be used indefinitely.

Referring again to FIG. 1, the color selector wheel 14 includes color selection indicia in the form of geometrical symbols 22, including but not limited to an equilateral triangle 24, isosceles triangle 26, square 28 and rectangle 30 centered on the selector wheel 14, and two arrows 32 lying on the same cross-sectional plane and on opposite edges of the selector wheel 14. The geometric symbols 22 have a primary vertex 34 usually indicated with a star or other identifying mark, and secondary vertices 36 lacking the identifying mark. Likewise, one arrow 32 contains the identifying mark 34 while the opposing arrow 32 does not. The geometric symbols 22 used are not limited to those identified in shape or number, but can be any symmetrical symbol, e.g. pentagon, hexagon etc., which provides harmonious color combinations.

In the illustrated embodiment, the primary vertex 34 of the equilateral triangle 24 and the isosceles triangle 26 are opposite to one another 180° about the periphery of the selector wheel 14. The square 28 and the non-equilateral rectangle 30 are arranged such that their respective vertices 34 and 36 do not overlap, and their respective primary vertices 34 on non-adjacent vertices. The use of these indicia 22 provides two, three, or four color combinations. It will be appreciated by those skilled in the art that the primary vertices 34 of the triangles are not necessarily opposite 180° to one another nor is it necessary that the corners or vertices of the square and rectangle be non-overlapping. In fact, alternative embodiments may be used wherein the symmetrical geometric shapes are cut-out or otherwise rotate independently of one another.

When choosing a combination based on an existing fabric, fiber, paint chip, or other sample, the user places the existing sample under the cutout windows 18 of the base 12 and moves the sample from window 18 to window 18 until the closest color and value match is found. The color selection group 16 and value number subsection 20 are noted. The user then decides whether he or she prefers a two, three or four color combination.

The color selector device 10 uses the geometric symbols 22 to indicate how many colors a combination has. The arrows 32 provide two-color combinations which are complementary. The equilateral triangle 24 provides three-color or triad color combinations. The isosceles triangle 26 provides three-color split-complementary combinations. The square 28 and rectangle 30 provide four-color or tetrad color combinations.

Based on the user's choice for the number of colors in the final combination, the marked primary vertex 34 of the symbol 22 on the selector wheel 14 that corresponds to the number of colors desired is rotated so that the star on the primary vertex 34 aligns with and is pointed to the selection group 16 having the selected color value. The secondary vertices 36 of the geometric symbol 22 are automatically aligned with and point to corresponding color selector groups 16 which form harmonious, balanced color combinations.

Using the color selector device 10, six two-color combinations based on the arrows 32, four three-color combinations based on the equilateral triangle 24, twelve three-color combinations based on the isosceles 26, four four-color combinations based on the square 28 and six four-color combinations based on the rectangle 30 are possible. The user can also use the subsections 20 within the selection group 16 to form monochromatic combinations, or the color selection groups 16 on either side of the selected group 16 to find analogous, or blending, color combinations. Other combinations are possible and known in the art.

A unique aspect of the present invention is the possibility of finding progressive color combinations of coordinating colors. This is accomplished by selecting a first color combination, for example a three-color combination using the equilateral triangle 24. Additional color combinations are produced by next placing the primary vertex 34 of the arrow 32, isosceles triangle 26, square 28, or rectangle 30 in the position that the primary vertex 34 of the equilateral triangle had. The color combinations are progressive in that after using the arrows 32, the isosceles triangle 26 can next be used and then the square 28 on so forth until the desired color combinations are reached.

When the user finds a combination of colors which pleases him or her, the color and value number of each selection group 16 and subsection 20 is noted. The user can now choose materials that closely match the chosen colors and easily check to make sure they are accurate by placing the materials under the cut-out windows 18.

Although there are a few exceptions, matching the color value on the identified selection groups 16 is an important component of choosing successful color combinations. Even though the color combinations developed through the use of the device 10 are harmonious, mixing values results in a spotty look and is distracting. However, when values match, such as all pastels or all jewel tones, the eye moves more easily across the colors without distracting the eye. Although there is a limit to the number of colors which can be placed on any given device 10, resulting in the user occasionally not finding an exact match since the starting or existing color may be a grayed-down tone of one the colors of the selector device 10, an associating match with one of the color selection groups 16 and value subsections 20 is still possible to find a related harmonious combination.

Although several embodiments have been described in detail for purposes of illustration, various modifications may be made without departing from the scope and spirit of the invention. Accordingly, the invention is not to be limited, except as by the appended claims.

What is claimed is:

1. A device for determining harmonious color combinations, comprising:

a color selector wheel;

a base to which the color selector wheel is rotatably attached, the base including a plurality of distinct color selection groups disposed beyond and surrounding the periphery of the color selection wheel, each color group forming an unobstructed window; and color selection indicia on a face of the color selector wheel, the color selection indicia including multiple symmetrical geometric symbols centered on the face of the color selector wheel, the indicia each having a marked primary vertex and a plurality of secondary vertices disposed adjacent to the periphery of the color selector wheel, the multiple geometric symbols being comprised of at least one triangle and at least one quadrilateral, the at least one triangle including an equilateral triangle and an isosceles triangle disposed on the face of the color selector wheel such that the marked primary vertices are opposite to one another 180° about the periphery of the wheel, and the at least one quadrilateral including a square and a non-equilateral rectangle disposed on the face of the color selector wheel such that there is no overlap of the vertices of each, whereby alignment of the marked primary vertex with a selected color selection group automatically aligns the secondary vertices with harmonious color combination selection groups.

2. The device of claim 1, wherein the color selection indicia includes a pair of arrows disposed on opposite edges of the color selector wheel.

3. The device of claim 1, wherein the plurality of distinct color section groups each contain multiple sub-sections having individual predetermined color values, the color values of the multiple sub-sections of the color groups correlating with one another.

4. The device of claim 1, wherein a progressive harmonious color combination scheme is achieved when a marked primary vertex of a first symmetrical geometric symbol aligned with the selected color selection group is replaced by a marked primary vertex of a second symmetrical geometric symbol.

5. A device for determining harmonious color combinations, comprising:

a color selector wheel;

a base to which the color selector wheel is rotatably attached, the base including a plurality of distinct color selection groups each containing multiple sub-sections having individual predetermined color values, the color values of the multiple sub-sections of the color groups correlating with one another, the plurality of color groups being disposed beyond and surrounding the periphery of the color selection wheel, each color group forming an unobstructed window; and color selection indicia on a face of the color selector wheel, the color selection indicia including multiple symmetrical geometric symbols centered on the face of the color selector wheel, the indicia each having a marked primary vertex and a plurality of secondary vertices disposed adjacent to the periphery of the color selector wheel, the multiple geometric symbols being comprised of at least one triangle and at least one quadrilateral and a pair of arrows disposed on opposite edges of the color selector wheel, the at least one triangle including an equilateral triangle and an isosceles triangle disposed on the face of the color selector wheel such that the marked primary vertices are opposite to one another 180° about the periphery of the wheel, and the at least one quadrilateral including a square and a non-equilateral rectangle disposed on the face of the color selector wheel such that there is no overlap of the vertices of each, whereby alignment of the marked primary vertex with a selected color selection group automatically aligns the secondary vertices with harmonious color combination selection groups; and wherein a progressive harmonious color combination scheme is achieved when a marked primary vertex of a first symmetrical geometric symbol aligned with the selected color selection group is replaced by a marked primary vertex of a second symmetrical geometric symbol.

* * * * *